United States Patent
Petersen

(12) 
(10) Patent No.: US 6,659,547 B2
(45) Date of Patent: Dec. 9, 2003

(54) ADJUSTABLE BACK REST AND CARGO CARRIER FOR A MOTORCYCLE

(76) Inventor: David R. Petersen, 22521 98th Ave. W., Edmonds, WA (US) 98020

( * ) Notice: Subject to any disclaimer, the term of this patent is extended or adjusted under 35 U.S.C. 154(b) by 9 days.

(21) Appl. No.: 09/917,528

(22) Filed: Jul. 27, 2001

(65) Prior Publication Data

US 2002/0011745 A1 Jan. 31, 2002

Related U.S. Application Data

(60) Provisional application No. 60/221,834, filed on Jul. 28, 2000.

(51) Int. Cl.$^7$ .................................................. B62J 1/00
(52) U.S. Cl. .............................. 297/215.1; 297/215.12; 297/410; 297/353; 280/304.4
(58) Field of Search ....................... 297/193.12, 195.12, 297/215.1, 215.11, 215.12, 410, 397, 353; 280/290, 304.4

(56) References Cited

U.S. PATENT DOCUMENTS

| | | | | |
|---|---|---|---|---|
| 3,698,762 A | * | 10/1972 | Gorman | 297/215.12 |
| 3,822,917 A | * | 7/1974 | George | 297/215.12 |
| 4,032,189 A | | 6/1977 | Benavente et al. | |
| 4,447,088 A | * | 5/1984 | Bodlovic | 224/413 |
| 4,466,660 A | * | 8/1984 | Mabie | 224/413 |
| RE33,178 E | * | 3/1990 | Ahlberg | 180/219 |
| 5,026,119 A | * | 6/1991 | Frank et al. | 16/300 |
| 5,441,330 A | | 8/1995 | Rojas | |
| 5,588,698 A | * | 12/1996 | Hsueh | 280/288.4 |
| 6,007,150 A | * | 12/1999 | Clerkin et al. | 297/215.12 |
| 6,390,220 B1 | * | 5/2002 | Galbraith et al. | 180/219 |

* cited by examiner

Primary Examiner—Peter M. Cuomo
Assistant Examiner—Stephanie Harris

(57) ABSTRACT

An adjustable back rest for a motorcycle comprising a carrier assembly connected to the frame of the motorcycle, a back plate assembly pivotally attached to the carrier assembly and positionable at an inclination angle, and an extensible slide connected between the carrier assembly and the back plate assembly that extends or retracts to thereby adjust the inclination angle of the back plate assembly and then is secured in place to position the back plate assembly as desired. A pillion rest is attached to the back plate assembly and is angularly adjustable by positioning a plurality of bar links connected between the pillion rest and the back plate assembly. The carrier assembly can be positioned and secured to the motorcycle frame to provide back rest support for the driver, or it may be positioned and secured to a cargo carrier attached to the frame to provide back rest support for the passenger.

1 Claim, 6 Drawing Sheets

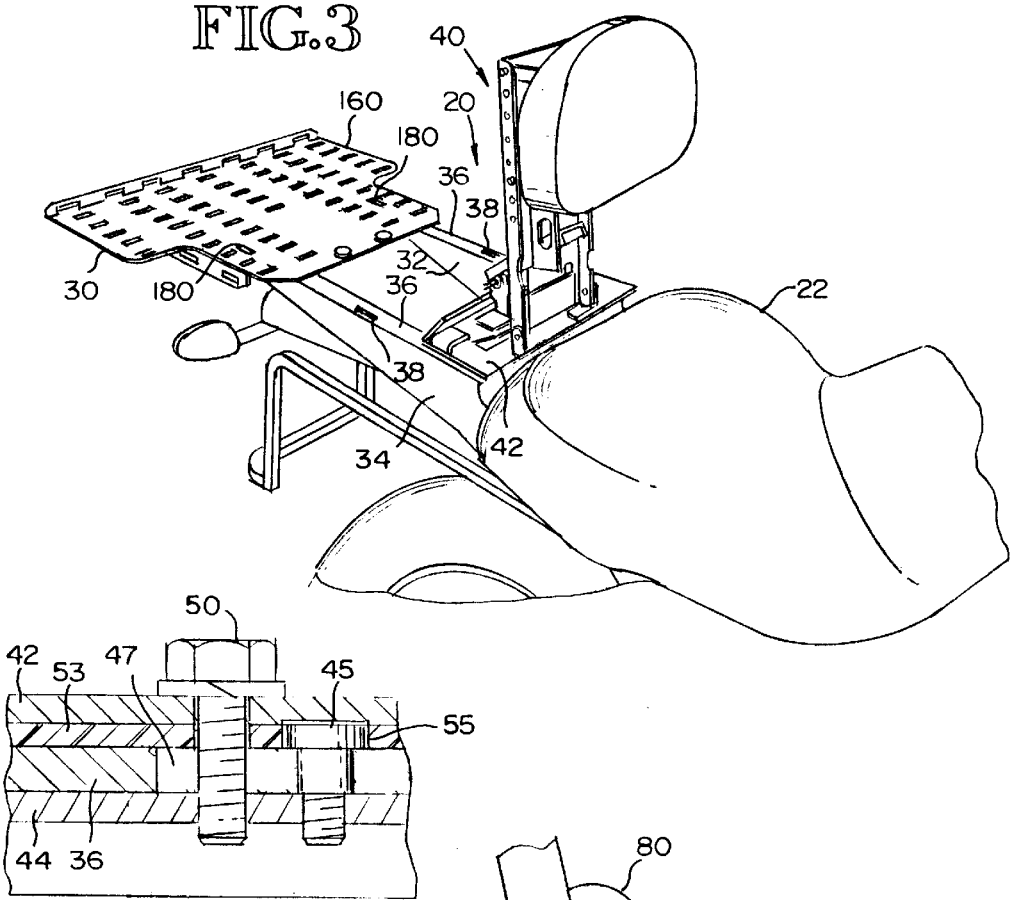
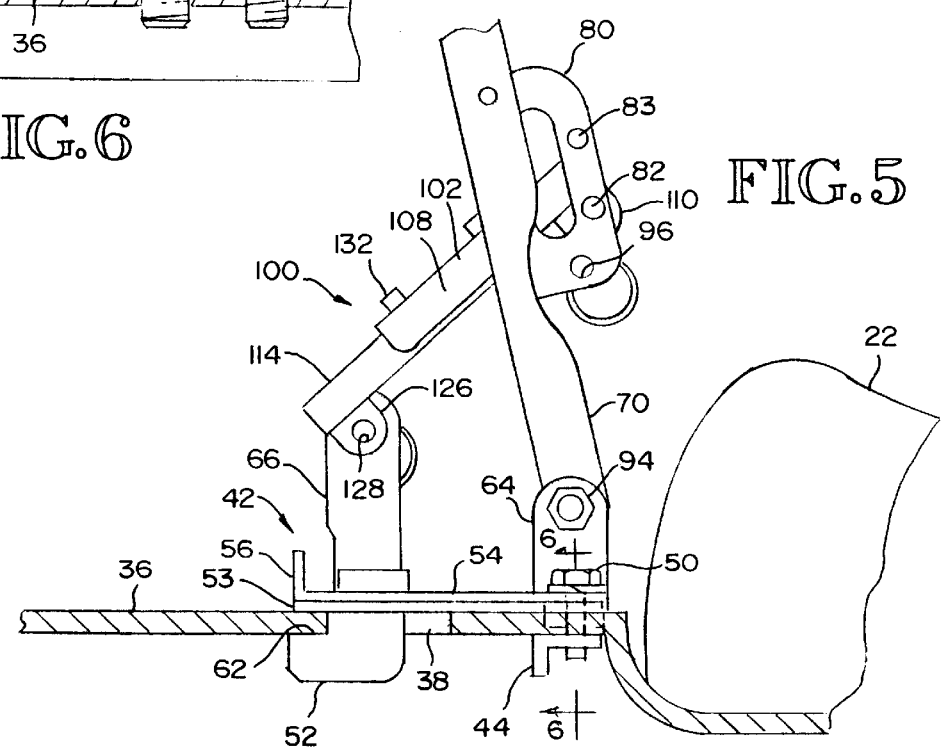

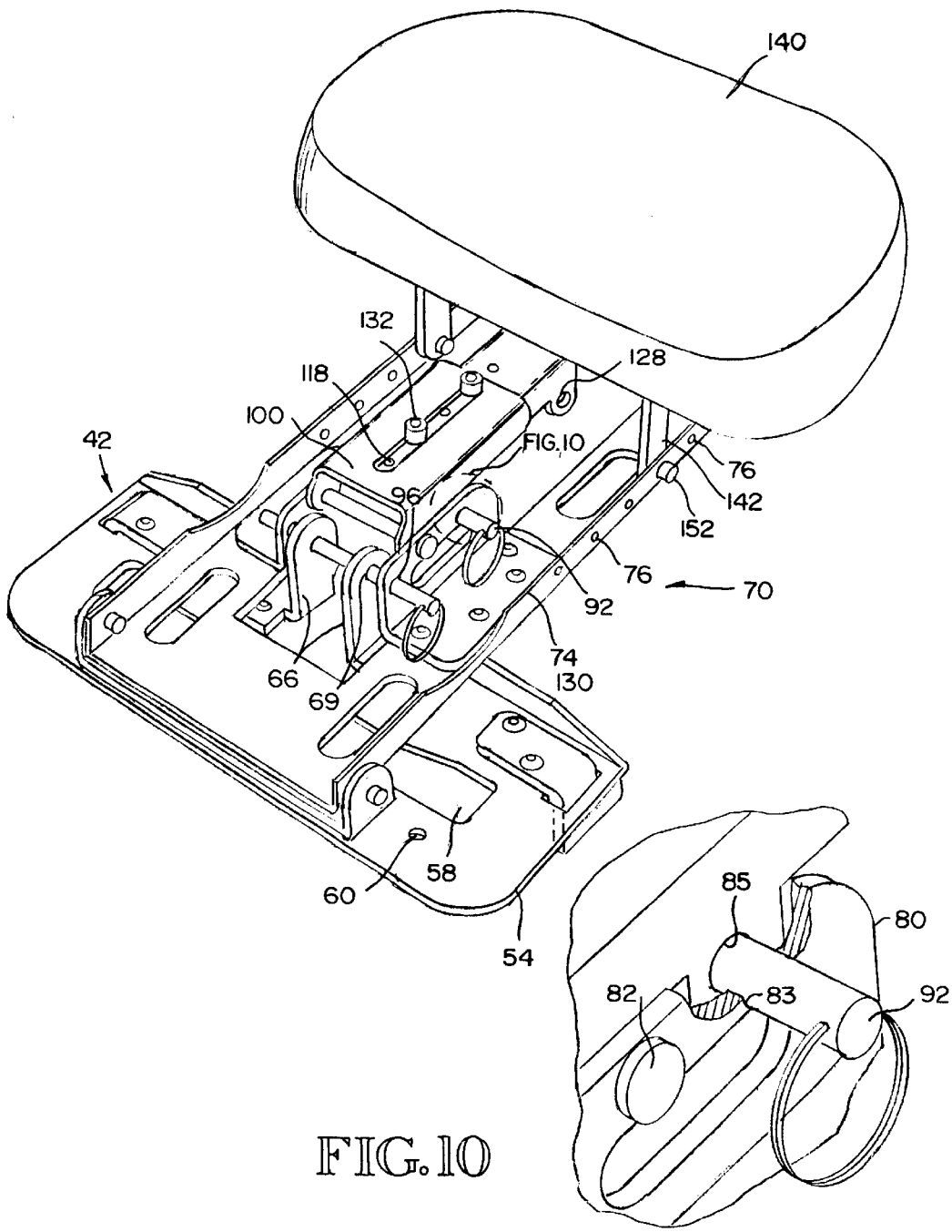

US 6,659,547 B2

ADJUSTABLE BACK REST AND CARGO CARRIER FOR A MOTORCYCLE

CROSS REFERENCE TO RELATED APPLICATIONS

This application claims the benefit, under 35 U.S.C. 119 (e), of U.S. provisional application Ser. No. 60/221,834, filed Jul. 28, 2000, pending.

BACKGROUND OF INVENTION

1. Field of the Invention.

The present invention relates, generally, to motorcycle back rests. More particularly, the invention relates to a motorcycle back rest that is adjustable and movable for a rider seated in the driver's position or in the passenger position.

2. Background Information.

The state of the art includes various devices for supporting the back of a motorcycle rider or passenger with an adjustable back rest.

U.S. Pat. No. 4,032,189 to Benavente et al. discloses a frame structure that extends angularly upward and rearward, and a mechanism which allows the entire structure to slide forward or back and to pivot within limits to change the angle of the structure. It does not provide a cushioned back rest, nor a way to adjust to shape of the back rest relative to the back of a rider or passenger.

U.S. Pat. No. 5,441,330 to Rojas discloses a back rest device which can be positioned vertically to support the back of a rider or passenger or it can be positioned horizontally so that the back rest portion is stored behind the seat when not in use, or the back rest portion may be used as a cargo carrier. This provides a padded back rest and cargo carrier, but there is no angular or vertical adjustment of the padded portion.

U.S. Pat. No. 4,466,660 to Mabie discloses a back rest that can be positioned in a forward or rearward position to support the back of an driver or passenger respectively. The device includes a padded portion that has tilt adjustment using a ball and socket means and vertical adjustment by telescoping tubes which are the supports for the padded portion. The telescoping tubes are at a fixed angle relative to the seat and do not provide for any angular adjustment of them.

U.S. Pat. No. 5,026,119 to Frank et al. discloses a padded contoured back support which is adjustable horizontally and vertically and which is spring-biased to pivot forward to maintain contact against a rider's back.

The present invention provides an improved adjustable motorcycle back rest and cargo carrier.

SUMMARY OF INVENTION

The present invention provides an adjustable back rest for a motorcycle which comprises a carrier assembly connected to the frame of the motorcycle, a back plate assembly pivotally attached to the carrier assembly and positionable at an inclination angle, and an extensible slide connected between the carrier assembly and the back plate assembly. The slide extends or retracts to thereby adjust the inclination angle of the back plate assembly.

The slide pivotally connects to the back plate assembly at a pair of spaced parallel normally-projecting attachment flanges and to the carrier assembly at a pair of spaced parallel upwardly projecting rear hinge posts, preferably with a quick release pin at both connections.

The back rest includes a pillion rest attached to the back plate assembly. The pillion rest is preferably angularly adjustable relative to the back plate assembly. The angular adjustment is accomplished by a plurality of bar links connected between the pillion rest and the back plate assembly. The bar links are preferably two pair of pivot arms that connect between flanges on the pillion rest and flanges on the back plate assembly. Both sets of flanges have a plurality of aligned spaced apertures, and the pivot arms connect between selected apertures to position the pillion rest at a desired angle relative to the back plate assembly.

The extensible slide has first and second portions that slidably engage each other and can be selectively released or secured relative to each other by a fastening mechanism operating between the two portions to allow the slide to be extended or retracted to a desired position and then secured in place to position the back plate assembly as desired.

The carrier assembly preferably has at least one hook member extending below it that engages an element connected to the motorcycle frame to retain the carrier assembly against the frame when the carrier assembly is located immediately behind the driver's seat so the back plate assembly can be positioned to provide back rest support for the driver. To provide back rest support for the passenger, a cargo carrier is attached to the motorcycle frame and has at least one aperture which receives the at least one hook member of the carrier assembly to retain the carrier assembly against the cargo carrier such that the carrier assembly is located behind the passenger seat and the back plate assembly can be positioned to provide back rest support for the passenger.

The extensible slide can be disconnected form the carrier assembly to allow the back rest to be pivoted rearward to a non-operational horizontal position and secured to better facilitate mounting and dismounting the motorcycle by the driver.

The features, benefits and objects of this invention will become clear to those skilled in the art by reference to the following description, claims and drawings.

BRIEF DESCRIPTION OF DRAWINGS

FIG. 3 is the view of FIG. 2 with the passenger seat removed and a backrest of the preset invention installed in the driver position.

FIG. 5 is a side view of a portion of the back rest as shown in FIG. 3.

FIG. 6 is a cross sectional view taken along the line 6—6 in FIG. 5.

FIG. 9 is a perspective view of a back rest of the present invention in a non operational position secured in a substantially horizontal position.

FIG. 10 is a detail view of a portion of FIG. 9 showing a portion of an attachment flange cut away to reveal an aperture in the extensible slide that receives a quick connect pin to secure the slide.

DETAILED DESCRIPTION

Though the invention is described and illustrated with regard to a BMW motorcycle, it can be adapted to other motorcycles as well. For a BMW motorcycle, this invention requires no modification of the existing frame or other members of the motorcycle.

Figure 1:
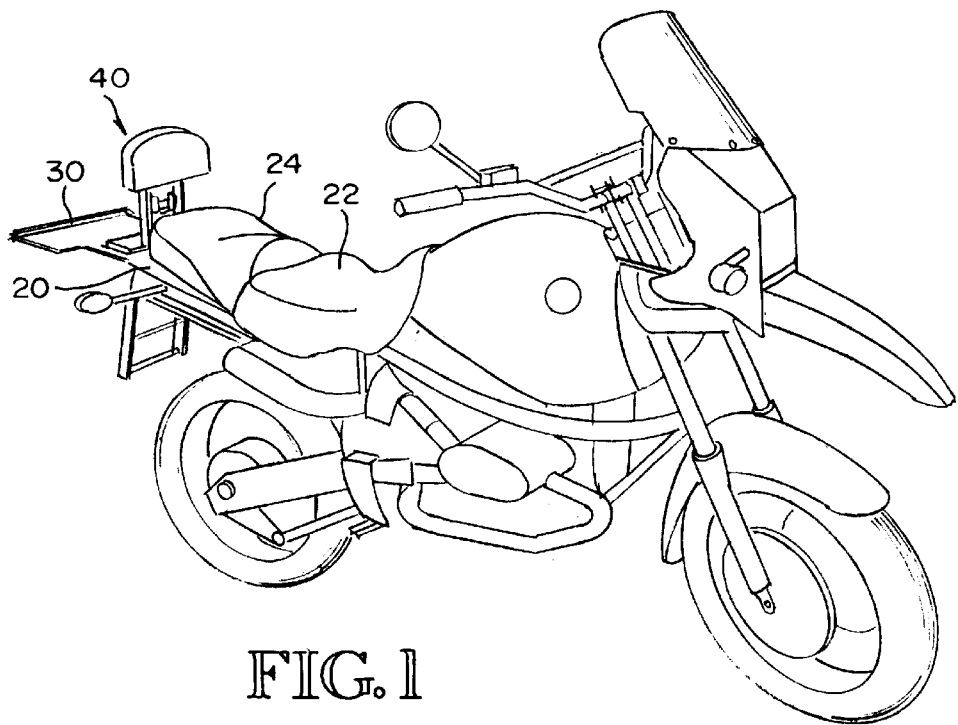
FIG. 1 is a perspective view of a motorcycle with a backrest of the present invention installed in the passenger position.
Figure 2:
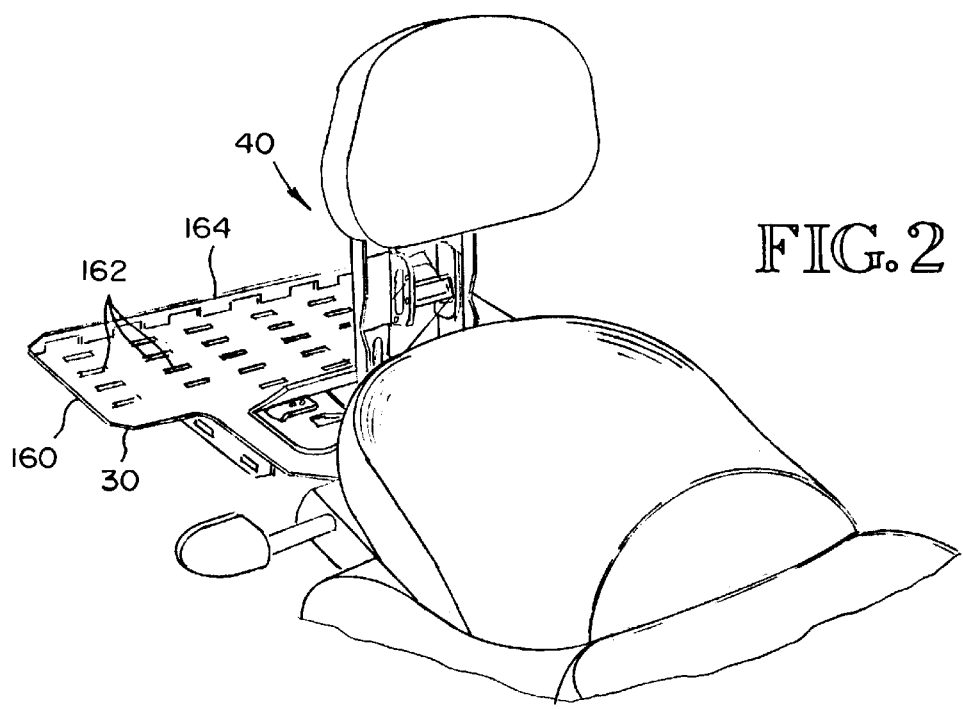
FIG. 2 is a detailed view of a portion of FIG. 1.
Figure 4:
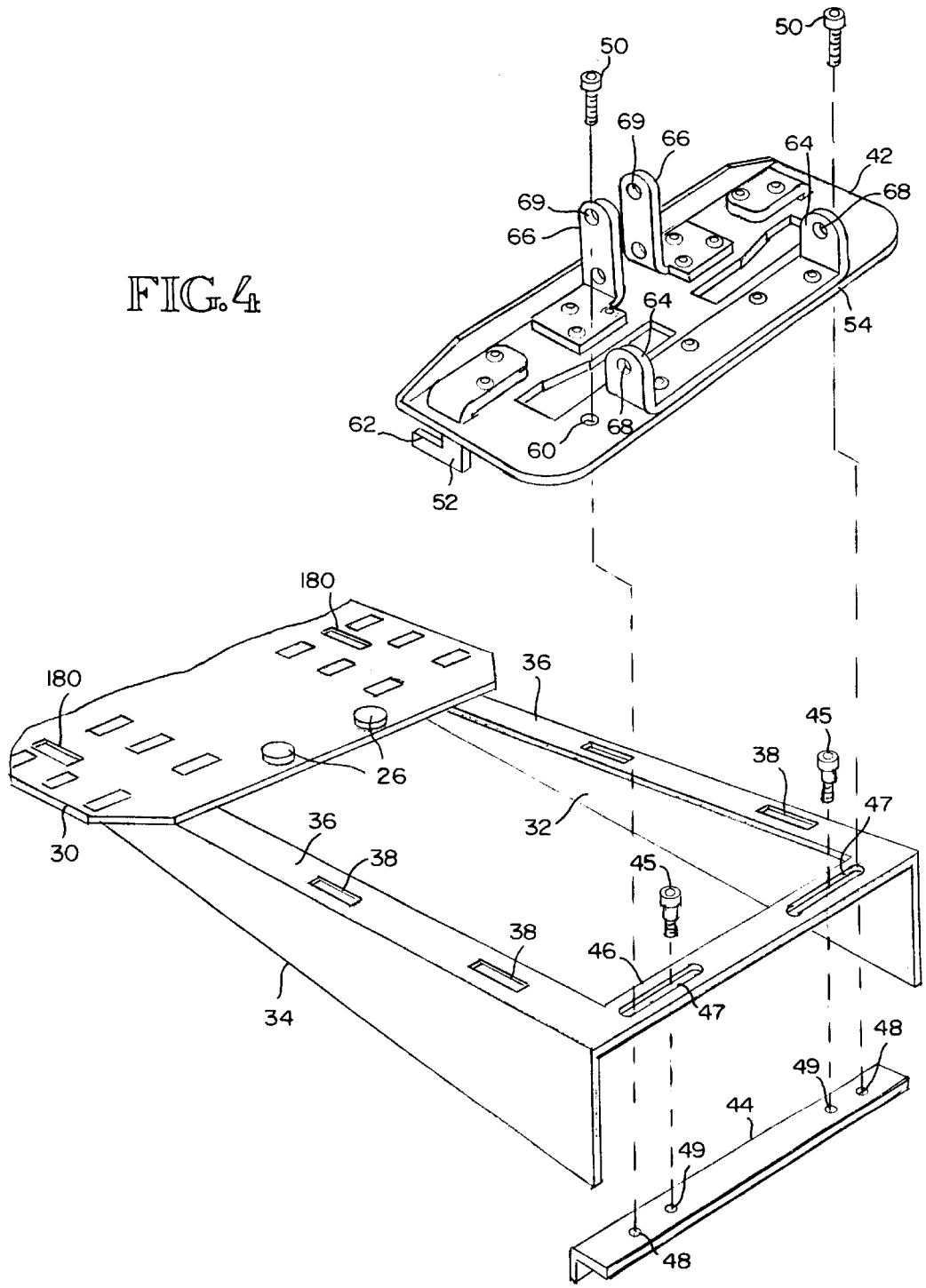
FIG. 4 is a partially exploded view of a portion of FIG. 3.

Referring to FIG. 1, the motorcycle illustrated, as provided by the factory, has a subframe 20 to which a driver seat 22 and a passenger seat 24 are attached. A luggage rack (not shown) is integral with and extends rearward from subframe 20. Referring also to FIG. 2, a preferred embodiment of the present invention has a cargo carrier 30 installed over the top of the luggage rack which provides for attachment of the adjustable back rest assembly 40 to provide adjustable back rest support for a passenger. Referring also to FIG. 3, when the driver is riding alone, the passenger seat 24 may be removed and the adjustable back rest assembly 40 installed in apparatus attached to the subframe 20 to provide adjustable back rest support for the driver.

Referring to FIGS. 3–6, the back rest assembly 40 comprises a carrier assembly 42 connected to the subframe 20, a back plate assembly 70 pivotally attached to the carrier assembly 42, and an extensible slide 100 connected between the carrier assembly 42 and the back plate assembly 70. In its operational position, the back plate assembly 70 is fully adjustable and positionable at an inclination angle by extending or retracting the slide 100. In its non operational position, the back plate assembly 70 may be pivoted rearward to a substantially horizontal position by disconnecting the extensible slide 100 from the carrier assembly 42.

The attachment of the back rest assembly 40 to subframe 20 at the location for the driver is as follows. Subframe 20 has two generally parallel members 32 and 34 running longitudinally on each side of the motorcycle behind the driver seat 22. Both members have a top portion 36, with rectangular shaped apertures 38 located behind the driver seat 22. These apertures 38 originally provide for attachment of the passenger seat. With the passenger seat removed, two of these apertures 38 located closest to the driver seat 22 are used to attach a carrier assembly 42 which provides the base for the adjustable back rest assembly 40. Forward of apertures 38, the subframe 20 has a transverse member 46 connected between the longitudinal members. A carrier subframe bar 44 is installed under that transverse member 46 so that it slides transversely within limits. Carrier subframe bar 44 is attached to transverse member 46 using shoulder screws 45 that engage threaded apertures 49 in subframe bar 44 through slots 47 in the top of transverse member 46. The shoulder screws 45 bottom against carrier subframe bar 44 and their heads extend above the top of transverse member 46 and are wider than the slots 47, thereby allowing subframe bar 44 to slide along the slots 47. Carrier subframe bar 44 has two threaded apertures 48 which receive screws 50 to secure carrier assembly 42 to it. Carrier assembly 42 has two hook members 52 which pass through apertures 38 and engage top portion 36 of the longitudinal members of subframe 20. A spacer plate 53, preferably made of plastic, such as nylon, is provided between the top portion 36 of subframe 20 and carrier assembly 42. Spacer plate 53 has apertures 55 which clear the heads of shoulder bolts 45 and provide spacing between the subframe 20 and the carrier assembly 42 for the heads of the shoulder screws 45 Referring also to FIGS. 5 and 7, carrier assembly 42 comprises a generally flat plate 54 preferably having a flange 56 at its rear edge to increase its stiffness. It may also have a plurality of lightening holes 58. It has two apertures 60 which receive screws 50 for attachment to carrier subframe bar 44, and, therefore, align with apertures 48 in carrier subframe bar 44. Hook members 52 extend downward orthogonally from plate 54 near its rear end. Hook members 52 have a notch 62 which receives top portion 36 of subframe 20. Carrier assembly 42 has two pair of hinge posts extending upward orthogonally from plate 54. A forward pair 64 provide for attachment of the back plate assembly 70 and a rear pair 66 provide for attachment of the extensible slide 100. Hinge posts 64 and 66 have apertures 68 and 69 respectively which receive fasteners, such as screws, bolts or pins that provide for pivotal attachment of the back plate assembly 70 and extensible slide 100 respectively. Carrier assembly 42, preferably is made of metal, such as aluminum or stainless steel. Plate 54 is preferably made of sheet stock with flange 56 bent, and hinge posts 64, 66 and hook members 54 are preferably machined or bent from flat stock and attached, such as by fasteners or by welding.

To install carrier assembly 42 onto subframe 20, the hook members 52 are inserted into apertures 38 then the carrier assembly 42 is slid rearward so that notches 62 of hook members 52 engage the top portion 36 of subframe 20 and apertures 60 align with threaded apertures 48 in carrier subframe bar 44. Screws 50 are then installed and tightened to secure carrier assembly to subframe 20.

Figure 7:
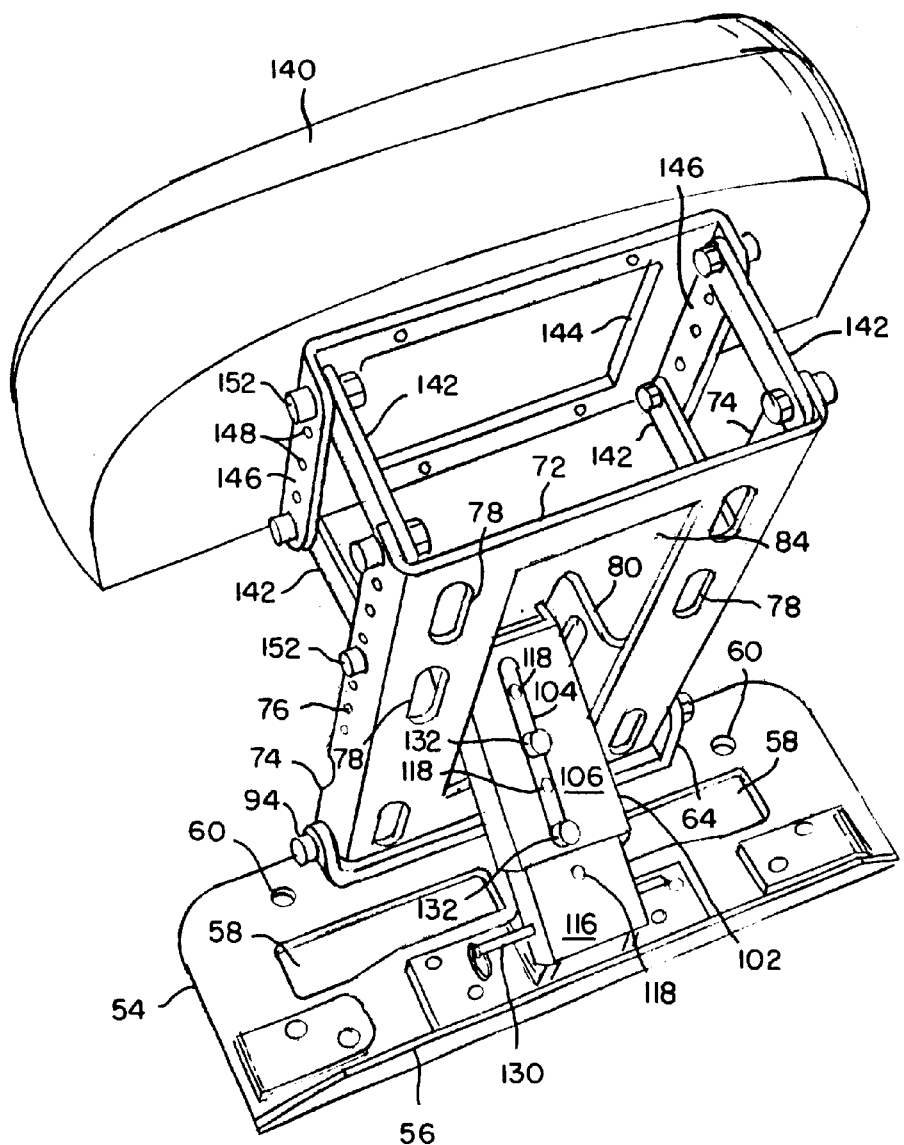
FIG. 7 is a rear perspective view of a back rest of the present invention.
Figure 8:
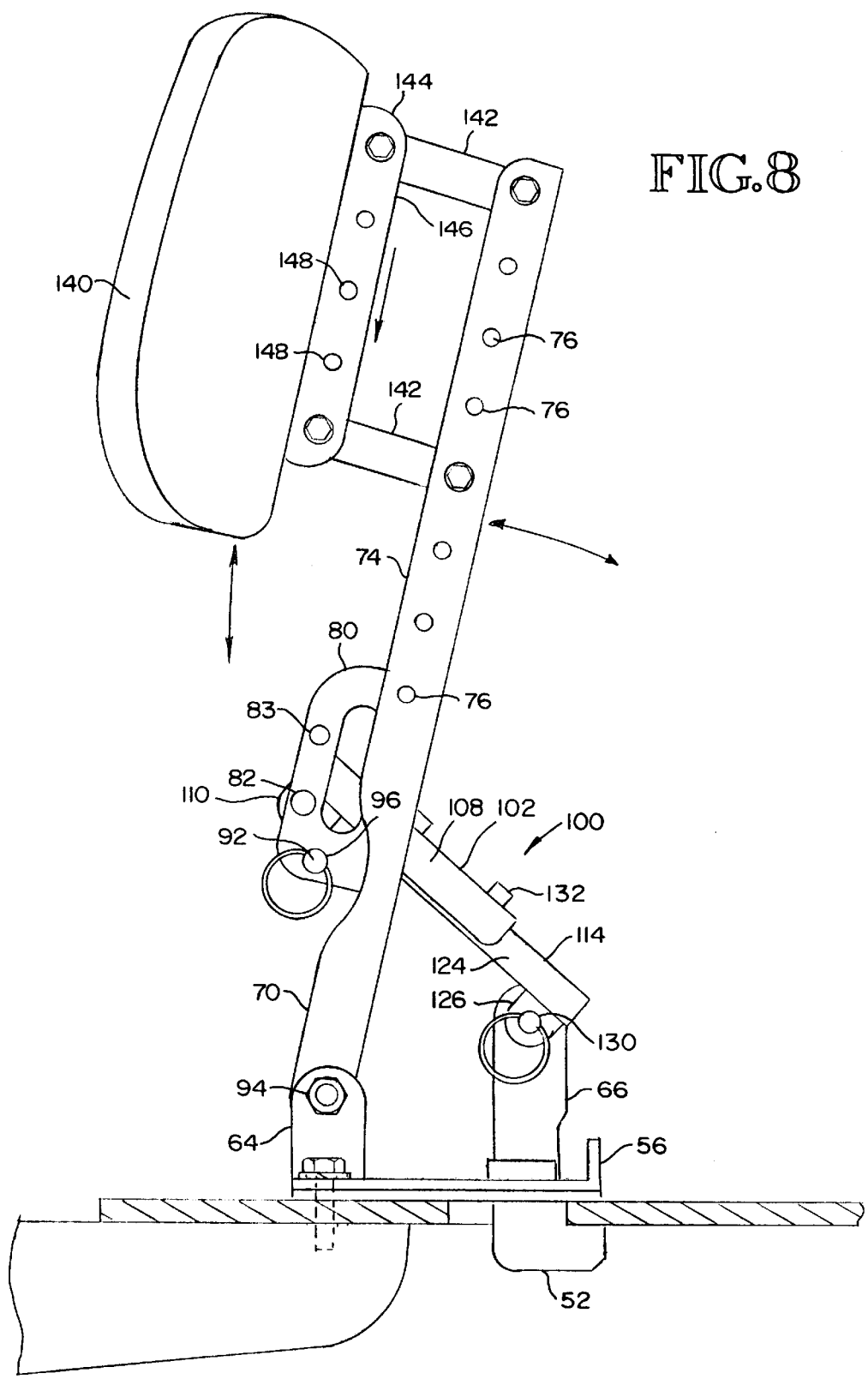
FIG. 8 is a side view of the back rest as shown in FIG. 7.

Referring to FIGS. 5, 7, and 8, back plate assembly 70 pivotally attaches to forward hinge posts 64. Back plate assembly 70 comprises a rectangular shaped plate 72 having flanges 74 at both longitudinal edges for increased stiffness. Flanges 74 are preferably bent edges of plate 72. Both flanges 74 extend the same direction from plate 72 and are preferably approximately orthogonal to plate 72. Each flange 74 has a plurality of longitudinally spaced apertures 76, preferably aligned along the centerline of flange 74. Apertures 76 receive fasteners 152 for pivot arms 142 attached to a padded pillion rest 140 and provide for adjustment of it.

Plate 72 has a plurality of lightening holes 78, which may be of any suitable size, and a large central aperture 84, preferably rectangular in shape, through which extensible slide 100 passes, and which allows rear hinge posts 66 to pass through plate 72 when back plate assembly 70 is pivoted to a horizontal position near subframe 20.

Plate 72 has a pair of attachment flanges 80 in spaced parallel arrangement, preferably approximately along longitudinal edges of central aperture 84, and preferably equally spaced from the longitudinal centerline of plate 72, which provide for pivotal attachment of extensible slide 100 at pivot 82, which preferably is a pin or bolt. Pivot 82 is preferably a fastener that is not necessary to remove, such as a bolt or a pin that is secured with a retaining ring. Such fasteners require tools to remove them. Alternatively, pivot 82 could be a fastener, such as a quick release pin that could be removed without tools if it is desirable that the extensible slide 100 be completely removable from back plate assembly 70.

Attachment flanges 80 each have two additional apertures 83 and 96 are used to secure back plate assembly 70 and extensible slide 100 when the back plate assembly is pivoted to a horizontal position as will be explained below. An additional quick release pin 92 used for that purpose is stored in apertures 96 when the back plate assembly 70 is in a supportive position.

Fasteners 94, such as bolts, connect flanges 74 of plate 72 to forward posts 64 of carrier assembly 42 at aperture 68 to allow plate 72 to pivot about fasteners 94.

Extensible slide 100 connects rear hinge posts 66 to back plate assembly 70 at the attachment flanges 80 and provides for adjustment of the inclination angle of back plate assembly 70, which preferably ranges from a position forward of vertical to one greatly reclined rearward.

Extensible slide 100 is comprised of a first portion and a second portion that slidably engage each other and a fastening mechanism to selectively release or secure the first and second portions relative to each other to allow the slide to be extended or retracted to a desired position and then secured in place. The first portion, upper slide 102, is a channel structure with an elongated slot 104 along the centerline of the channel base 106. Channel flanges 108 preferably have extensions 110 with apertures through them which receive the pivot 82 to connect the upper slide to the attachment flanges 80 of back plate assembly 70.

The second portion, lower slide 114, is also a channel structure having a width that will be received between flanges 108 of upper slide 102. Channel base 116 of the lower slide 114 has a plurality of apertures 118 which align with slot 104 in upper slide 102. The fastening mechanism is at least one, and preferably two, fasteners 132. Channel flanges 124 have extensions 126 with apertures 128 which receive a fastener, such as a quick release pin 130, to connect lower slide 114 to rear hinge posts 66.

Extensible slide 100 is assembled by sliding lower slide 114 into upper slide 102 and installing two fasteners 132, such as bolts, through slots 104 and apertures 18. For added security, apertures 118 may be threaded for fasteners 132 to threadably engage and a locking washer used with the fastener, or locking nuts used on the fasteners 132 so they will not loosen due to vibration. The fasteners 132 may alternatively have a feature, such as a large diameter head, that allows them to be tightened or loosened by hand rather than with tools. However, since there are usually only one or two riders for a particular motorcycle, adjustment to the extensible slide 100 should not have to be made very often. Thus the preferred fasteners are those that require tools to loosen to minimize the risk that the slide could be inadvertently loosened and allow the back rest to slip if an easily loosenable fastener, such as a hand-nut, were used.

To adjust the inclination angle of back plate assembly 70, the length of extensible slide 100 is adjusted by loosening fasteners 132, sliding upper slide 102 relative to lower slide 114 to achieve the desired position, then tightening fasteners 132 to lock extensible slide 100 at that position. By selecting which apertures 118 to install fasteners 132 into, extensible slide 100 can range from a greatly extended position resulting in a position of back plate assembly 70 approximately 15 degrees forward of vertical, to a greatly collapsed position resulting in back plate assembly 70 having an angle of inclination of approximately 45 degrees rearward of vertical.

Referring to FIGS. 7 and 8, a padded pillion rest 140 is adjustably attached to the back plate assembly 70 by a plurality of bar links such as pivot arms 142 connected between flanges 74 of back plate assembly 70 and a pillion plate 144 attached to the back of pillion rest 140. Pillion plate 144 is a plate with a pair of edge flanges 146 similar to back plate assembly 70. Flanges 146 are preferably spaced the same as flanges 74, and have a plurality of spaced apertures 148 similar to apertures 76 on flanges 74. Flanges 146 align with flanges 74 and a pair of pivot arms 142 are connected between one flange 146 and one flange 74 at apertures 148 and 76 respectively, and another pair of pivot arms 142 are similarly connected between the other flange 146 and other flange 74. Pivot arms 142 have apertures which align with apertures 148 and apertures 76 and receive fasteners 152, such as bolts, to secure pivot arms 142 to flanges 146 and 74.

The vertical position and angular position of pillion rest 140 is adjustable by selecting which of apertures 76 and 148 the pivot arms 142 will be attached to, and by moving the pillion plate 144 relative to the back plate assembly 70. For example, as shown in FIG. 8, when the pivot arms 142 are parallel to each other, the angular position of pillion rest 140 does not change as pillion plate 144 is moved from an upper position illustrated to a lower position illustrated. However pivot arms 142 may be connected between flanges 146 and 74 so that the arms 142 are not parallel to each other. In that case, as pillion plate 144 is moved between an upper position and a lower position, the angular position of pillion rest 140 also changes. Once the pillion rest 140 is in the desired position, the fasteners 152 can be tightened to secure it in that position. This 4-bar linkage type mechanism allows for great variation in the position of pillion rest 140 relative to back plate assembly 70.

Referring again to FIGS. 2–4, cargo carrier 30 is attached to subframe 20 and extends rearward of subframe 20. Cargo carrier 30 provides for attachment of back rest assembly 40 in a position to provide adjustable back rest support for the passenger. Cargo carrier 30 is a generally flat plate 160 having a plurality of rectangular apertures 162, spaced to provide for attachment of tie down devices, such as elastic straps having hooks on each end. A rear portion 164 of plate 160 is bent upward, preferably at an angle less than 90 degrees, to provide additional stiffness for the portion of cargo carrier 30 extending beyond subframe 20 as well as to prevent cargo from sliding off the back.

Cargo carrier 30 is clamped to subframe 20 and luggage rack 28 using front and rear cargo subframe bars which extend transversely under subframe 20 in a manner similar to carrier subframe bar 44. Apertures are provided in plate 160 for receiving screws which threadably engage the cargo bars to provide the clamping mechanism that secures cargo carrier 30 to subframe 20. Those screws preferably have countersunk heads so they are flush with the top surface of plate 160. The front cargo subframe bar is preferably identical to carrier subframe bar 44 and has threaded apertures which align with apertures in plate 160 for receiving screws 50 used to secure back rest assembly 40 to cargo carrier 30.

Cargo carrier 30 may be further secured to subframe 20 by fasteners 26 secured to subframe 20. On the BMW motorcycle, fasteners 26 replace a grab rail which is supplied on the stock motorcycle. Replacing the grab rail with fasteners 26 provides the largest flat area for carrying cargo. Alternatively, the grab rail may be retained and used to help secure cargo carrier 30 to subframe 20. The vertical tubes of the grab rail pass through apertures in the cargo carrier 30 and help clamp the cargo carrier against the subframe 20.

Plate 160 also has two rectangular apertures 180 which preferably have the same size and spacing as apertures 38 in subframe 20 and which receive hook members 52 of carrier assembly 42 in the same manner. At the longitudinal location of apertures 180 the longitudinal members of carrier subframe 20 are converging. Apertures 180 are located on plate 160 so that they are outside of the converging members of subframe 20, and, therefore, allow hook members 52 to engage plate 160 without interfering with subframe 20. Back rest assembly 40 is installed and secured to cargo carrier 30 in the same manner as it was installed and secured to subframe 20 in the forward position previously described.

For attachment to a brand of motorcycle other than a BMW, rather than using two hook members, other mechanisms, such as fasteners or a single hook member, may be used to engage other portions of the motorcycle frame, a cargo carrier, or other member attached to the frame.

Referring to FIGS. 9 and 70, the back plate assembly 70 can be pivoted rearward to a non operational horizontal position when the back rest assembly 40 is in either the passenger or driver position. This makes it easier for the driver or passenger to mount the motorcycle when the back rest is not in use. To put the back plate assembly 70 in the horizontal position, quick release pin 92 is removed from apertures 96 (see also FIG. 8), and quick release pin 130 is removed from apertures 128 to disconnect extensible slide 100 from rear hinge posts 66 of carrier assembly 42. The back plate assembly 70 can then be pivoted horizontally rearward which allows apertures 96 in attachment flanges 80 to align with apertures 69 in rear hinge posts 66, and quick release pin 130 is reinstalled through those apertures to secure back plate assembly 70 in the horizontal position. The extensible slide 100 this then positioned so that apertures 83 align with apertures 85 in extensible slide 100 and quick release pin 92 installed through those apertures to secure extensible slide 100 in a position relatively parallel to back plate assembly 70. With components thus secured, there is no rubbing or chattering of the components against each other when the motorcycle is driven.

The present invention provides an adjustable back rest that provides both vertical and angular adjustment of a padded pillion rest on an assembly that is easily installed in either a rearward position to provide back rest support for the passenger, or in a forward position to provide back rest support for the driver. The mechanism allows the padded pillion rest to be positioned vertically, horizontally and angularly in a large space so that the driver or passenger can obtain comfortable back support, and allows the adjustable back rest to easily be pivoted down to a horizontal position extending rearward when its use is not desired so that the driver or passenger may mount or dismount without interference.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims.

What is claimed is:

1. An adjustable back rest and cargo carrier for a motorcycle, comprising:

a carrier assembly connected to a motorcycle frame;

a back plate assembly pivotally attached to the carrier assembly and positionable horizontally and at a first inclination angle; and an extensible slide connected between the carrier assembly and the back plate assembly, the slide having a first portion and a second portion that slidably engage each other and a fastening mechanism to selectively release or secure the first and second portions relative to each other to allow the slide to be extended or retracted to a desired position and then secured in place to thereby adjust the inclination angle of the back plate assembly from a horizontal position to said first inclination angle, and a pillion rest attached to the back plate assembly, the pillion rest being angularly adjustable relative to the back plate assembly, whereby said back rest plate assembly may be positioned horizontally as a cargo carrier and inclined to a first inclination angle as a back rest.

* * * * *